(12) United States Patent
Al Sheikh et al.

(10) Patent No.: US 11,789,740 B2
(45) Date of Patent: Oct. 17, 2023

(54) PERFORMING BRANCH PREDICTOR TRAINING USING PROBABILISTIC COUNTER UPDATES IN A PROCESSOR

(71) Applicant: Microsoft Technology Licensing, LLC, Redmond, WA (US)

(72) Inventors: Rami Mohammad Al Sheikh, Morrisville, NC (US); Michael Scott McIlvaine, Raleigh, NC (US); Daren Eugene Streett, Cary, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/535,359

(22) Filed: Nov. 24, 2021

(65) Prior Publication Data
US 2023/0161595 A1    May 25, 2023

(51) Int. Cl.
*G06F 9/38*   (2018.01)

(52) U.S. Cl.
CPC .......... *G06F 9/3844* (2013.01); *G06F 9/3806* (2013.01); *G06F 9/3848* (2013.01)

(58) Field of Classification Search
CPC ..... G06F 9/3806; G06F 9/3844; G06F 9/3848
See application file for complete search history.

(56) References Cited

U.S. PATENT DOCUMENTS

| | | | | |
|---|---|---|---|---|
| 2008/0263341 | A1* | 10/2008 | Ozer | G06F 9/3832 |
| | | | | 712/239 |
| 2009/0063831 | A1 | 3/2009 | Ekman | |
| 2018/0136937 | A1* | 5/2018 | Yang | G06F 9/3848 |
| 2019/0205143 | A1* | 7/2019 | Natarajan | G06F 9/3005 |

OTHER PUBLICATIONS

Morris, "Counting Large Numbers of Events in Small Registers", Communications of the ACM, vol. 21, Issue 10, Oct. 1978, pp. 840-842.*
Gehringer, "Improved Branch Predictors", North Carolina State University, 2002, pp. 1-11.*

(Continued)

*Primary Examiner* — David J. Huisman
(74) *Attorney, Agent, or Firm* — Withrow & Terranova, PLLC

(57) ABSTRACT

Performing branch predictor training using probabilistic counter updates in a processor is disclosed herein. In some aspects, a branch predictor training circuit of a processor is configured to determine whether a first branch prediction generated for a first conditional branch instruction by a branch predictor circuit of the processor is correct. Based on determining whether the first branch prediction is correct, the branch predictor training circuit probabilistically updates a first counter, corresponding to the first branch prediction, of a plurality of counters of a first branch predictor table of a plurality of branch predictor tables. In some aspects, the branch predictor training circuit probabilistically updates the first counter based on a global probability value corresponding to all branch predictor tables, while in some aspects the branch predictor training circuit is configured to probabilistically update the first counter based on a table-specific probability value corresponding to the first branch predictor table.

15 Claims, 7 Drawing Sheets

(56) References Cited

OTHER PUBLICATIONS

Riley et al., "Probabilistic Counter Updates for Predictor Hysteresis and Stratification", IEEE, 2006, pp. 111-121.*
Jimenez, Daniel A., "Multiperspective Perceptron Predictor with TAGE," Retrieved from: https://jilp.org/cbp2016/paper/DanielJimenez1.pdf, Jun. 2016, pp. 1-5.
Seznec, André, "Analysis of the O-GEometric History Length branch predictor," In 32nd International Symposium on Computer Architecture, Jun. 4, 2005, 12 Pages.
Seznec, André, "TAGE-SC-L Branch Predictors Again," In Proceedings of 5th JILP Workshop on Computer Architecture Competitions (JWAC-5): Championship Branch Prediction, Jun. 2016, pp. 1-4.
Zhao, et al., "A Novel Probabilistic Saturating Counter Design for Secure Branch Predictor", In Journal of Computer Science and Technology, vol. 36, Issue 5, Sep. 30, 2021, pp. 1022-1036.
"International Search Report and Written Opinion Issued in PCT Application No. PCT/US22/042819", dated Dec. 14, 2022, 11 Pages.

\* cited by examiner

PERFORMING BRANCH PREDICTOR TRAINING USING PROBABILISTIC COUNTER UPDATES IN A PROCESSOR

FIELD OF THE DISCLOSURE

The technology of this disclosure relates to processing of instructions for execution in a microprocessor ("processor"), and, in particular, to branch prediction of conditional branch instructions in a processor.

BACKGROUND

Microprocessors, also referred to herein as "processors," perform computational tasks for a wide variety of applications. A conventional processor includes a central processing unit (CPU) that includes one or more processor cores, or "CPU cores." The CPU executes computer program instructions ("instructions" or "software instructions") to perform operations based on data and generate a result. The result may then be stored in a memory, provided as an output to an input/output ("I/O") device, or made available (i.e., communicated) as an input value to another instruction executed by the CPU, as non-limiting examples.

A processor may employ a processing technique known as instruction pipelining, whereby the throughput of computer instructions being executed may be increased by dividing the processing of each instruction into a series of steps which are then executed within an execution pipeline that is composed of multiple stages. Optimal processor performance may be achieved if all stages in an execution pipeline are able to process instructions concurrently and sequentially as the instructions are ordered in the execution pipeline. However, circumstances referred to as structural hazards may arise, whereby a next instruction cannot be executed without leading to incorrect computation results. For instance, a control hazard may occur as a result of execution of a conditional branch instruction, which may redirect the path of instruction execution based on an outcome evaluated when the conditional branch instruction is executed. When the conditional branch instruction is encountered, the processor may need to stall the fetching of additional instructions until the conditional branch instruction has executed, which may result in reduced processor performance and increased power consumption.

One approach for maximizing processor performance involves utilizing a branch predictor circuit to speculatively predict the path to be taken by a conditional branch instruction (based on, e.g., the results of previously executed conditional branch instructions), and basing the fetching of subsequent instructions on the branch prediction. When the conditional branch instruction reaches the execution stage of the instruction pipeline and is executed, the resultant target address of the conditional branch instruction is verified by comparing it with the previously predicted target address when the conditional branch instruction was fetched. If the predicted and actual target addresses match (i.e., the branch prediction was correct), no delay is incurred in instruction execution because the subsequent instructions at the target address will have been correctly fetched and will be present in the instruction pipeline. However, if the predicted and actual target addresses do not match, the instruction pipeline is flushed and the instruction pipeline fetch unit is redirected to fetch new instructions starting from the target address, resulting in delay and reduced performance.

Conventional branch predictor circuits employ multiple branch predictor tables, each of which stores multiple counters that each correspond to a branch prediction. To generate a branch prediction for a conditional branch instruction, some branch predictor circuits may access counters within the branch predictor tables (e.g., using a hash of the program counter of the conditional branch instruction, branch history, and/or path history as an index), and may scale each counter using a table-specific coefficient to reflect a weight assigned to each branch predictor table. The counters are then summed using an adder circuit, with the result indicating the branch prediction (e.g., a positive result indicates a branch-taken prediction, while a negative result indicates a branch-not-taken prediction). After the conditional branch instruction is executed and the outcome of the branch is determined, a branch predictor training circuit performs a process referred to herein as branch predictor training, in which the branch predictor training circuit updates the counters (e.g., by incrementing or decrementing the counters based on the outcome of the branch) according to a training algorithm.

Generally, larger capacity branch predictor tables and wider counters that employ more bits per counter result in more accurate branch predictions, because the additional bits enable the strength of correlation between each counter and the corresponding branch outcome to be more accurately specified and finely differentiated. However, design and performance constraints of the processor, such as cycle times, area constraints, and power constraints, may limit the physical size of the branch predictor tables used by a branch predictor circuit. Moreover, wider counters require more complex prediction hardware, such as wider adder circuits having slower speeds that impose processor frequency limitations.

SUMMARY

Aspects disclosed herein include performing branch predictor training using probabilistic counter updates in a processor. The processor provides a branch predictor training circuit that is configured to determine whether a branch prediction for a conditional branch instruction is correct, and, based on the determination, probabilistically update a counter corresponding to the branch prediction. As used herein, the term "probabilistically" and derivatives thereof, used in the context of updating a counter of a branch predictor table, mean that the counter is not always updated (i.e., incremented or decremented for 100% of branch predictions corresponding to that counter), but rather is updated according to a probability value that indicates the likelihood of the update being performed. Thus, for example, a probability value of 0.25 would indicate that the counter is updated for a randomly selected 25% of the branch predictions corresponding to that counter, while a probability value of 0.6 would indicate that the counter is updated for a randomly selected 60% of the branch predictions corresponding to that counter.

In some aspects, a global probability value may be applied to all branch predictor tables used by a branch predictor circuit, while some aspects may provide that table-specific probability values corresponding to each branch predictor table used by a branch predictor circuit are used. Similarly, a same probability value may be used for each counter transition of a counter (e.g., transitioning from a value of zero (0) to a value of one (1), from a value of one (1) to a value of two (2), and so forth) in some aspects, while some aspects may provide that different probability values may be used for different subsets of counter transitions. As non-limiting examples, a series of decreasing probability values may be used as a counter is incremented, and a series of increasing probability values may be used as a counter is decremented. Some aspects may provide that only some branch predictor tables are updated probabilistically, while other branch predictor tables are updated non-probabilistically. The branch predictor training circuit according to some aspects may also track a prediction accuracy for a branch predictor table, and may take action if the prediction accuracy falls below an accuracy threshold. For instance, the branch predictor training circuit may revert to non-probabilistically updating counters for a branch predictor table if the predictor accuracy falls below the accuracy threshold, and/or may reconfigure the branch predictor table to increase a number of bits of each counter stored within the branch predictor table.

Probabilistically updating counters enables the use of narrower counters that reproduce the functionality of wider counters while occupying less processor area. For example, a six (6)-bit counter that is non-probabilistically updated for 100% of branch predictions can be replaced with a four (4)-bit counter that is probabilistically updated for 25% of branch predictions. Because narrower counters occupy less processor area, more or larger branch predictor tables may be used within the same processor area, or the same number of branch predictor tables may be used within a smaller processor area. Additionally, decreasing the width of the counters enables the use of a simplified adder circuit that occupies less area and that can operate at higher frequencies. Probabilistically updating counters also eliminates the need for scaling coefficients for branch predictor tables, because the probability value associated with a given branch predictor table may be adjusted to incorporate a desired scaling coefficient for that branch predictor table. For instance, if a scaling coefficient of two (2) is desired for the branch predictor table, the probability value associated with the branch predictor table can be doubled (e.g., a probability value of 0.25 may be modified to a probability value of 0.5).

In this regard, in one exemplary aspect, a branch predictor training circuit is provided. The branch predictor training circuit is configured to determine whether a first branch prediction generated for a first conditional branch instruction by a branch predictor circuit of a processor is correct. The branch predictor training circuit is further configured to, based on determining whether the first branch prediction is correct, probabilistically update a first counter, corresponding to the first branch prediction, of a plurality of counters of a first branch predictor table of a plurality of branch predictor tables.

In another exemplary aspect, a method of training a branch predictor circuit is disclosed. The method comprises determining, by a branch predictor training circuit of a processor, whether a first branch prediction generated for a first conditional branch instruction by a branch predictor circuit of the processor is correct. The method further comprises, based on determining whether the first branch prediction is correct, probabilistically updating a first counter, corresponding to the first branch prediction, of a plurality of counters of a first branch predictor table of a plurality of branch predictor tables.

In another exemplary aspect, a processor-based system is disclosed. The processor-based system comprises a processor. The processor comprises a branch predictor circuit and a branch predictor training circuit. The branch predictor training circuit is configured to determine whether a first branch prediction generated for a first conditional branch instruction by the branch predictor circuit is correct. The branch predictor training circuit is further configured to, based on determining whether the first branch prediction is correct, probabilistically update a first counter, corresponding to the first branch prediction, of a plurality of counters of a first branch predictor table of a plurality of branch predictor tables.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
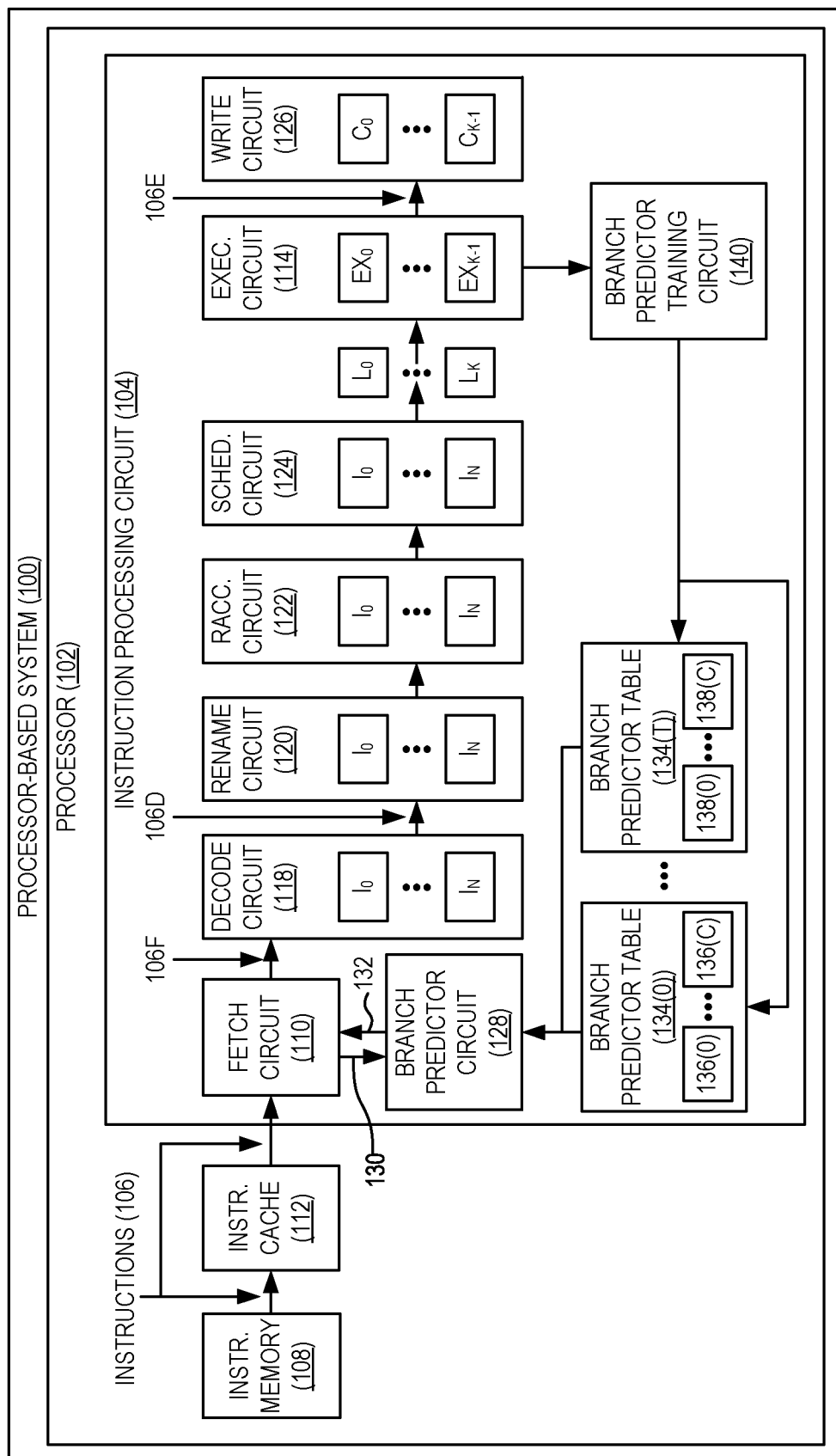
FIG. 1 is a diagram of an exemplary processor-based system that includes a processor with an instruction processing circuit that includes a branch predictor training circuit configured to perform branch predictor training using probabilistic counter updates.
Figure 2:
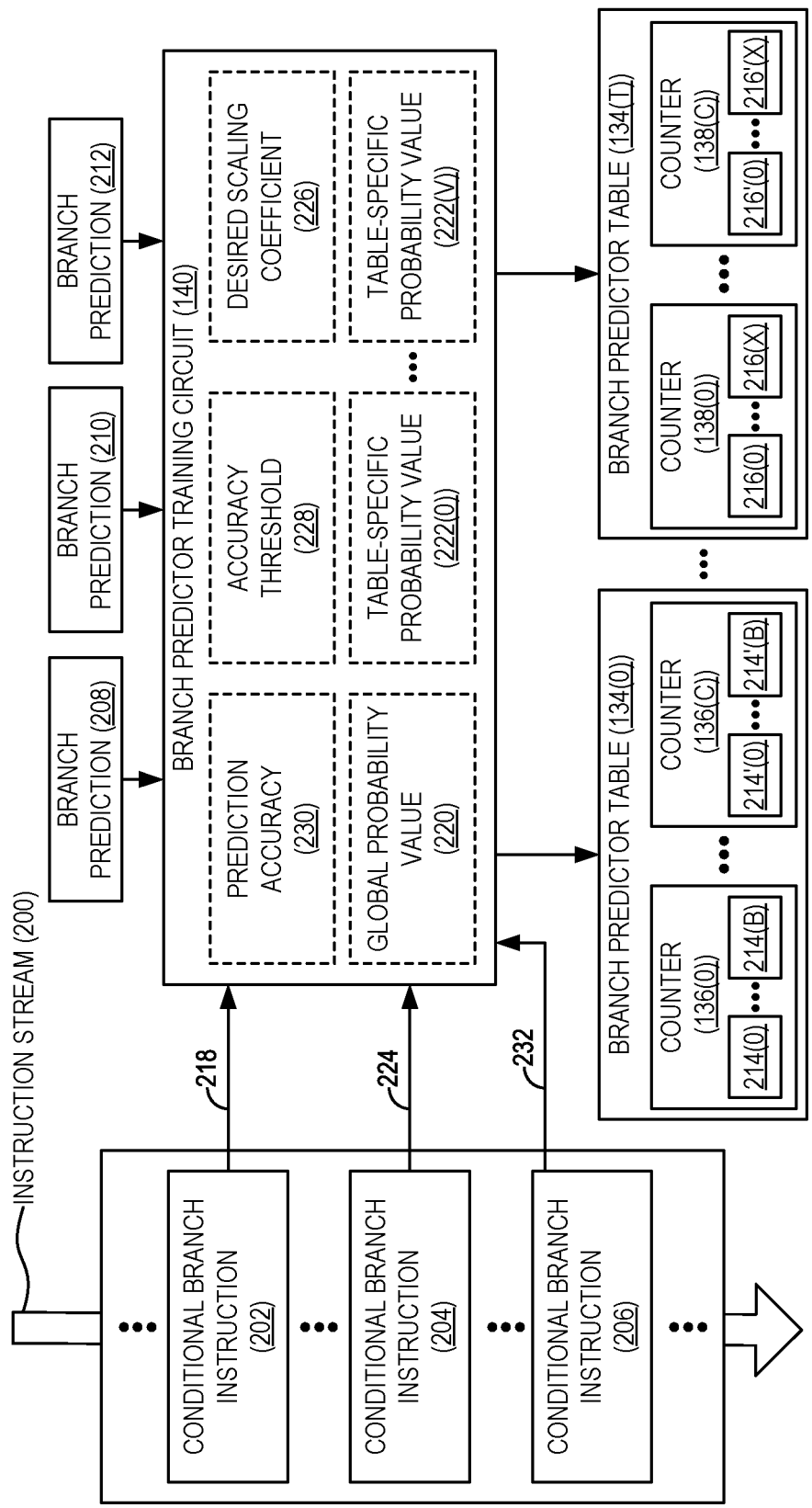
FIG. 2 illustrates exemplary aspects of the branch predictor training circuit of FIG. 1 in greater detail.
Figure 4A:
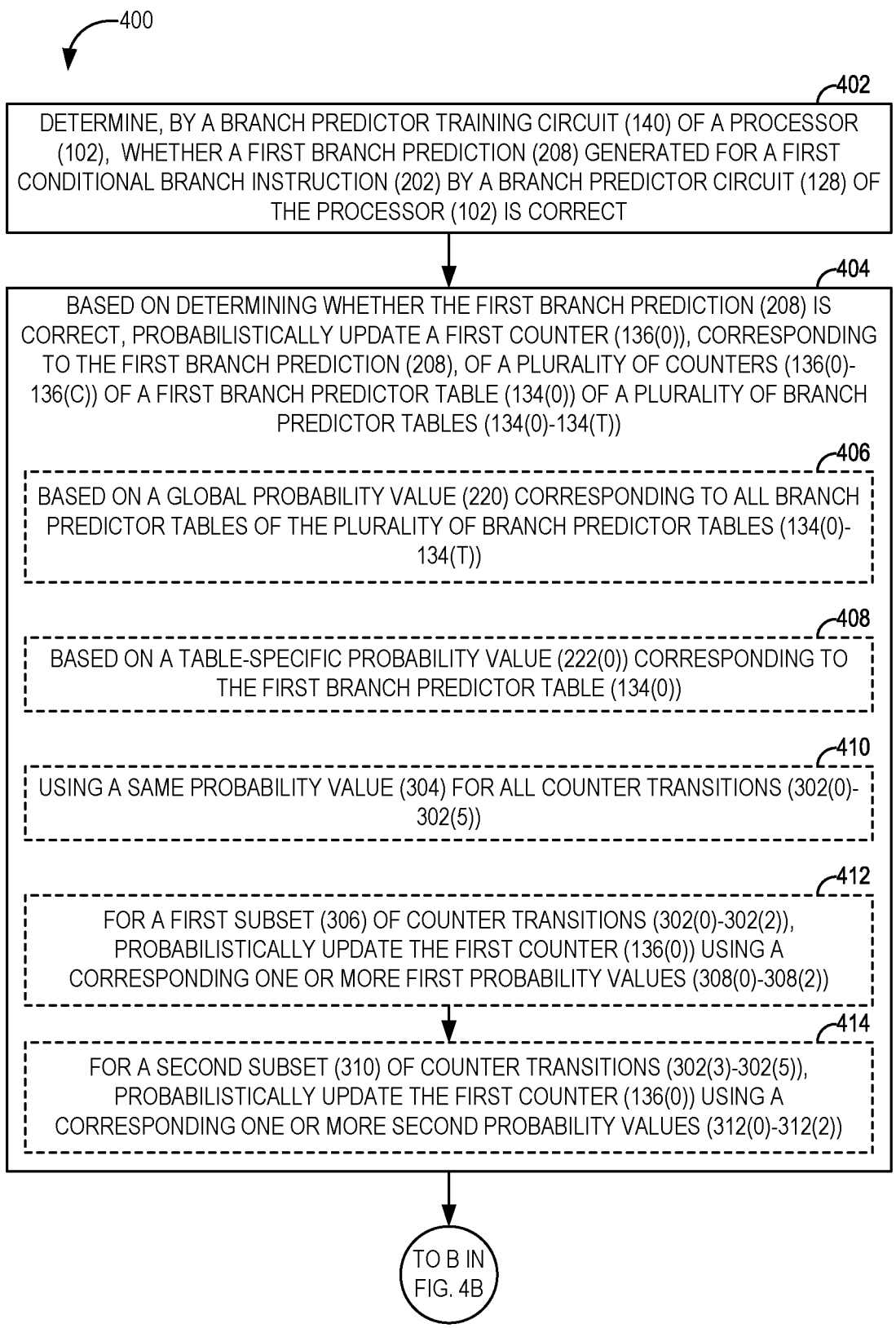
Figure 4B:
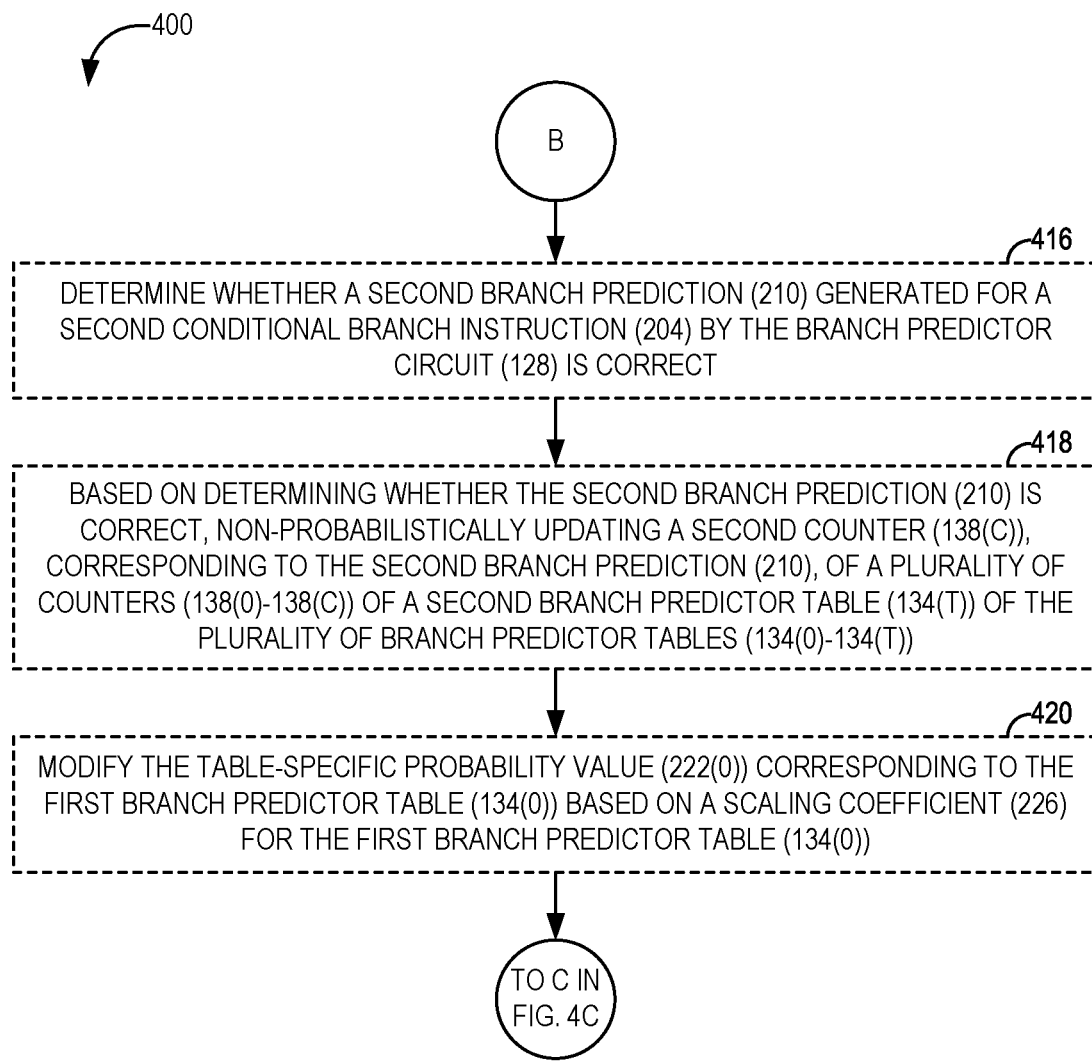
Figure 4C:
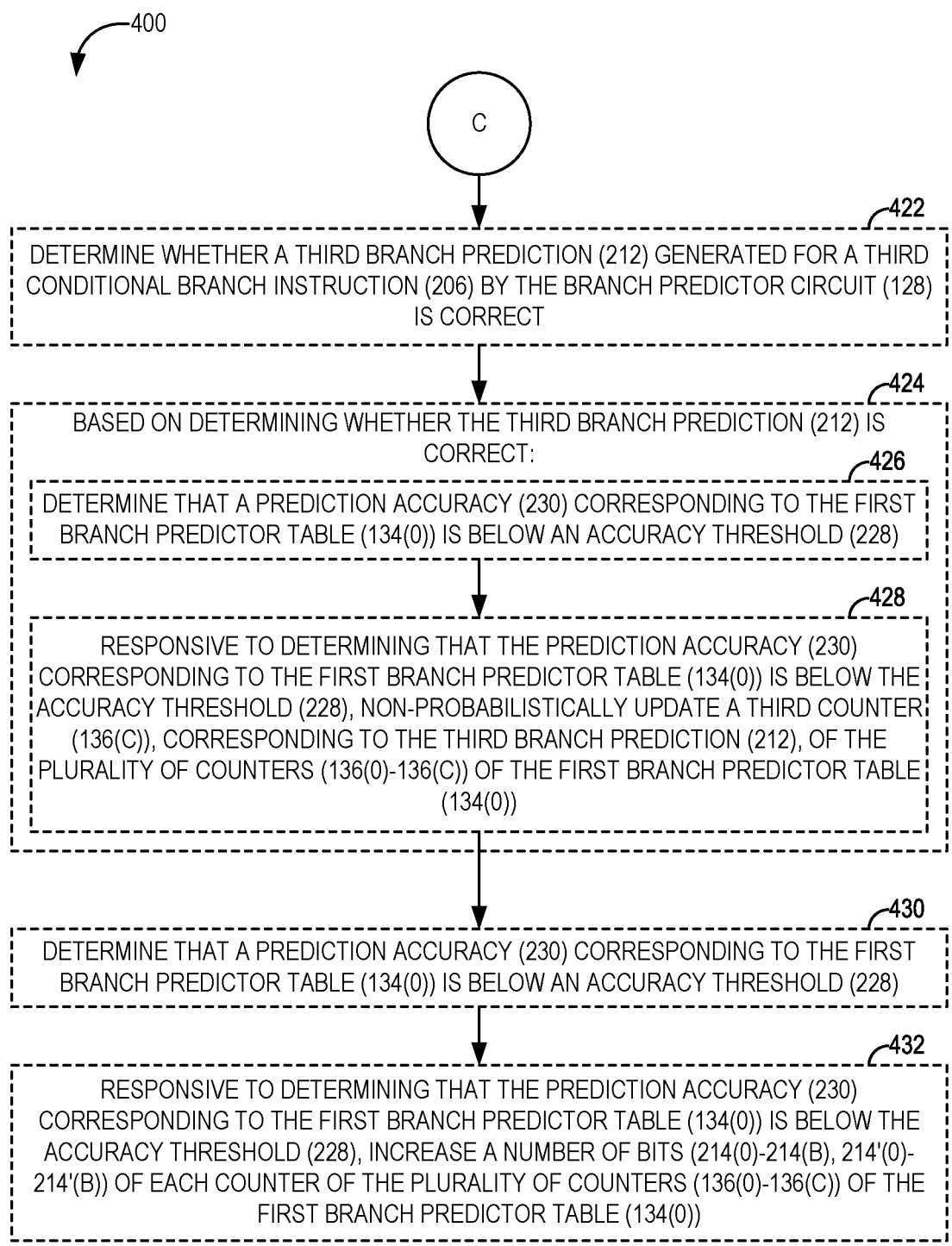
Figure 5:
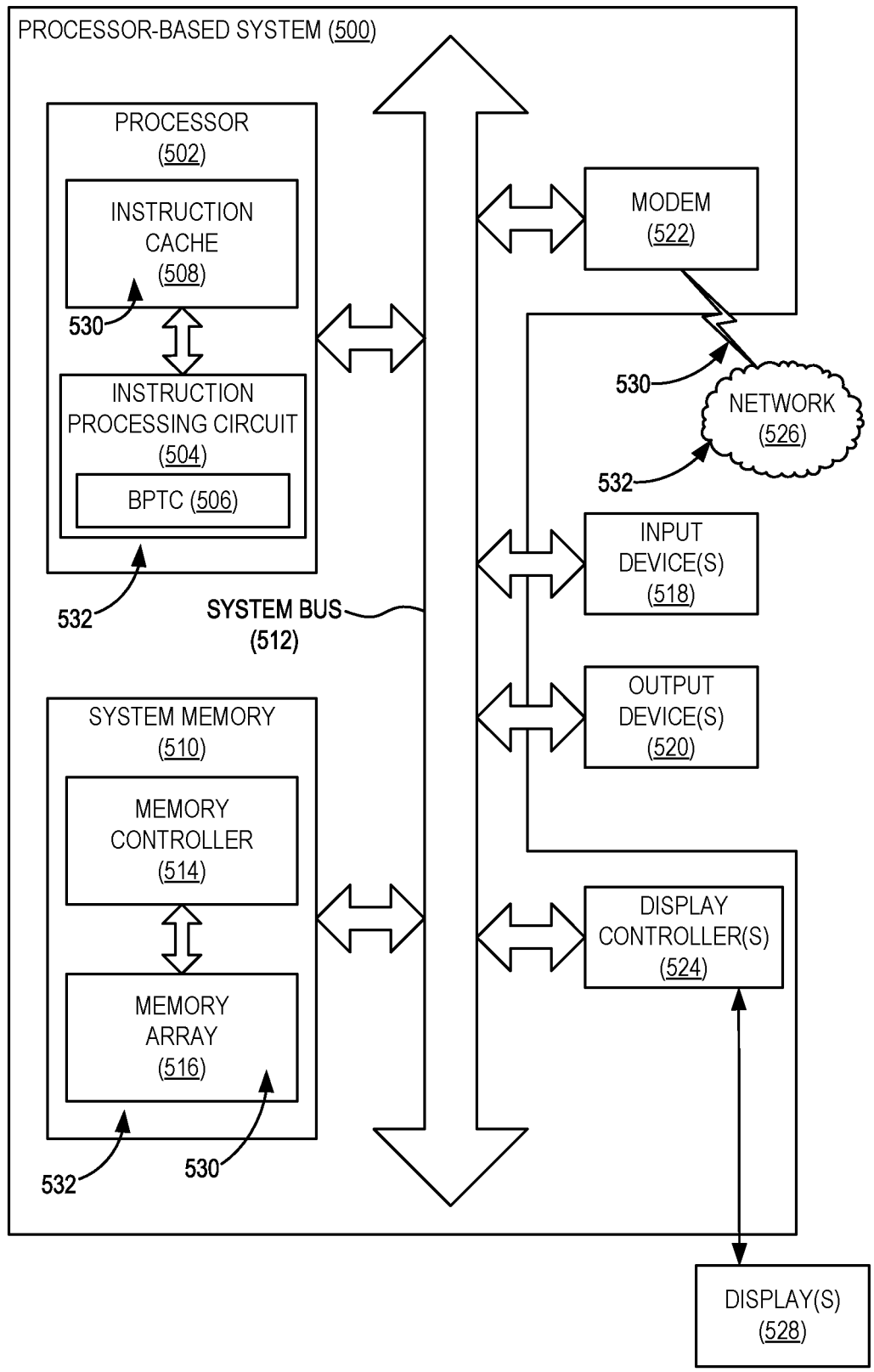

FIGS. 4A-4C are flowcharts illustrating exemplary operations performed by the branch predictor training circuit of FIGS. 1 and 2 for performing branch predictor training using probabilistic counter updates; and FIG. 5 is a block diagram of an exemplary processor-based system that includes a processor with an instruction processing circuit, such as the instruction processing circuit of FIG. 1 that includes a branch predictor circuit for predicting outcomes of branch instructions and a branch predictor training circuit for performing branch predictor training using probabilistic counter updates.

DETAILED DESCRIPTION

Aspects disclosed herein include performing branch predictor training using probabilistic counter updates in a processor. The processor provides a branch predictor training circuit that is configured to determine whether a branch prediction for a conditional branch instruction is correct, and, based on the determination, probabilistically update a counter corresponding to the branch prediction. As used herein, the term "probabilistically" and derivatives thereof, used in the context of updating a counter of a branch predictor table, mean that the counter is not always updated (i.e., incremented or decremented for 100% of branch predictions corresponding to that counter), but rather is updated according to a probability value that indicates the likelihood of the update being performed. Thus, for example, a probability value of 0.25 would indicate that the counter is updated for a randomly selected 25% of the branch predictions corresponding to that counter, while a probability value of 0.6 would indicate that the counter is updated for a randomly selected 60% of the branch predictions corresponding to that counter.

In some aspects, a global probability value may be applied to all branch predictor tables used by a branch predictor circuit, while some aspects may provide that table-specific probability values corresponding to each branch predictor table used by a branch predictor circuit are used. Similarly, a same probability value may be used for each counter transition of a counter (e.g., transitioning from a value of zero (0) to a value of one (1), from a value of one (1) to a value of two (2), and so forth) in some aspects, while some aspects may provide that different probability values may be used for different subsets of counter transitions. As non-limiting examples, a series of decreasing probability values may be used as a counter is incremented, and a series of increasing probability values may be used as a counter is decremented. Some aspects may provide that only some branch predictor tables are updated probabilistically, while other branch predictor tables are updated non-probabilistically. The branch predictor training circuit according to some aspects may also track a prediction accuracy for a branch predictor table, and may take action if the prediction accuracy falls below an accuracy threshold. For instance, the branch predictor training circuit may revert to non-probabilistically updating counters for a branch predictor table if the predictor accuracy falls below the accuracy threshold, and/ or may reconfigure the branch predictor table to increase a number of bits of each counter stored within the branch predictor table.

Probabilistically updating counters enables the use of narrower counters that reproduce the functionality of wider counters while occupying less processor area. For example, a six (6)-bit counter that is non-probabilistically updated for 100% of branch predictions can be replaced with a four (4)-bit counter that is probabilistically updated for 25% of branch predictions. Because narrower counters occupy less processor area, more or larger branch predictor tables may be used within the same processor area, or the same number of branch predictor tables may be used within a smaller processor area. Additionally, decreasing the width of the counters enables the use of a simplified adder circuit that occupies less area and that can operate at higher frequencies. Probabilistically updating counters also eliminates the need for scaling coefficients for branch predictor tables because the probability value associated with a given branch predictor table may be adjusted to incorporate a desired scaling coefficient for that branch predictor table. For instance, if a scaling coefficient of two (2) is desired for the branch predictor table, the probability value associated with the branch predictor table can be doubled (e.g., a probability value of 0.25 may be modified to a probability value of 0.5).

In this regard, FIG. 1 is a diagram of an exemplary processor-based system 100 that includes a processor 102. The processor 102, which also may be referred to as a "processor core" or a "central processing unit (CPU) core," may be an in-order or an out-of-order processor (OoP), and/or may be one of a plurality of processors 102 provided by the processor-based system 100. In the example of FIG. 1, the processor 102 includes an instruction processing circuit 104 that includes one or more instruction pipelines $I_0$-$I_N$ for processing instructions 106 fetched from an instruction memory (captioned "INSTR. MEMORY" in FIG. 1) 108 by a fetch circuit 110 for execution. The instruction memory 108 may be provided in or as part of a system memory in the processor-based system 100, as a non-limiting example. An instruction cache (captioned "INSTR. CACHE" in FIG. 1) 112 may also be provided in the processor 102 to cache the instructions 106 fetched from the instruction memory 108 to reduce latency in the fetch circuit 110.

The fetch circuit 110 in the example of FIG. 1 is configured to provide the instructions 106 as fetched instructions 106F into the one or more instruction pipelines $I_0$-$I_N$ in the instruction processing circuit 104 to be pre-processed, before the fetched instructions 106F reach an execution circuit (captioned "EXEC. CIRCUIT" in FIG. 1) 114 to be executed. The instruction pipelines $I_0$-$I_N$ are provided across different processing circuits or stages of the instruction processing circuit 104 to pre-process and process the fetched instructions 106F in a series of steps that can be performed concurrently to increase throughput prior to execution of the fetched instructions 106F by the execution circuit 114.

With continuing reference to FIG. 1, the instruction processing circuit 104 includes a decode circuit 118 configured to decode the fetched instructions 106F fetched by the fetch circuit 110 into decoded instructions 106D to determine the instruction type and actions required. The instruction type and action required encoded in the decoded instruction 106D may also be used to determine in which instruction pipeline $I_0$-$I_N$ the decoded instructions 106D should be placed. In this example, the decoded instructions 106D are placed in one or more of the instruction pipelines $I_0$-$I_N$ and are next provided to a rename circuit 120 in the instruction processing circuit 104. The rename circuit 120 is configured to determine if any register names in the decoded instructions 106D should be renamed to decouple any register dependencies that would prevent parallel or out-of-order processing.

The instruction processing circuit 104 in the processor 102 in FIG. 1 also includes a register access circuit (captioned "RACC. CIRCUIT" in FIG. 1) 122. The register access circuit 122 is configured to access a physical register in a physical register file (PRF) (not shown) based on a mapping entry mapped to a logical register in a register mapping table (RMT) (not shown) of a source register operand of a decoded instruction 106D to retrieve a produced value from an executed instruction 106E in the execution circuit 114. The register access circuit 122 is also configured to provide the retrieved produced value from an executed instruction 106E as the source register operand of a decoded instruction 106D to be executed.

Also, in the instruction processing circuit 104, a scheduler circuit (captioned "SCHED. CIRCUIT" in FIG. 1) 124 is provided in the instruction pipeline $I_0$-$I_N$ and is configured to store decoded instructions 106D in reservation entries until all source register operands for the decoded instruction 106D are available. The scheduler circuit 124 issues decoded instructions 106D that are ready to be executed to the execution circuit 114. A write circuit 126 is also provided in the instruction processing circuit 104 to write back or commit produced values from executed instructions 106E to memory (such as the PRF), cache memory, or system memory.

With continuing reference to FIG. 1, the instruction processing circuit 104 also includes a branch predictor circuit 128. The branch predictor circuit 128 is configured to speculatively predict the outcome of a fetched branch instruction that controls whether instructions corresponding to a taken path or a not-taken path in the instruction control flow path are fetched into the instruction pipelines $I_0$-$I_N$ for execution. For example, the fetched branch instruction may be a conditional branch instruction 130 that includes a condition to be resolved by the instruction processing circuit 104 to determine which instruction control flow path should be taken. In this manner, the outcome of the conditional branch instruction 130 in this example does not have to be resolved in execution by the execution circuit 114 before the instruction processing circuit 104 can continue processing fetched instructions 106F. The prediction made by the branch predictor circuit 128 can be provided as a branch prediction 132 to the fetch circuit 110 to be used to determine the next instructions 106 to fetch as the fetched instructions 106F.

The branch predictor circuit 128 generates branch predictions such as the branch prediction 132 using a plurality of branch predictor tables 134(0)-134(T). It is to be understood that, while the branch predictor tables 134(0)-134(T) are shown in FIG. 1 as elements separate from the branch predictor circuit 128, some aspects may provide that the branch predictor tables 134(0)-134(T) are implemented as constituent elements of the branch predictor circuit 128. Each of the branch predictor tables 134(0)-134(T) stores a plurality of counters such as the counters 136(0)-136(C) and 138(0)-138(C). The counters 136(0)-136(C) and 138(0)-138(C) are indexable entries (e.g., indexed by a hash of a program counter of a conditional branch instruction, branch history, and/or path history) comprising saturated counters that each represent a branch prediction as a signed value. The branch predictor circuit 128 is configured to speculatively predict the outcome of a conditional branch instruction such as the conditional branch instruction 130 by retrieving a counter (e.g. the counters 136(0) and 138(0), as non-limiting examples) from each of multiple ones of the branch predictor tables 134(0)-134(T), optionally scaling each counter 136(0), 138(0) by a table-specific scaling coefficient (not shown), and then summing the retrieved counters 136(0), 138(0) using an adder circuit (not shown). The sign of the sum of the counters 136(0), 138(0) then indicates the branch prediction 132.

After the conditional branch instruction 130 is executed by the execution circuit 114, the results of execution of the conditional branch instruction 130 are accessed by a branch predictor training circuit 140. While the branch predictor training circuit 140 is shown in FIG. 1 as an element separate from the branch predictor circuit 128, the branch predictor training circuit 140 according to some aspects is implemented as a constituent element of the branch predictor circuit 128. Based on the results of execution of the conditional branch instruction 130, the branch predictor training circuit 140 updates the counters 136(0), 138(0) corresponding to the branch prediction 132 according to a training algorithm. In conventional branch prediction, the branch predictor training circuit 140 would increment the counters 136(0), 138(0) if the branch prediction 132 is correct, and otherwise would decrement the counters 136(0), 138(0). In this manner, the counters 136(0), 138(0) over time should better represent the likely branch path of the conditional branch instruction 130 during subsequent executions of the series of instructions that include the conditional branch instruction 130.

As noted above, larger-capacity branch predictor tables such as the branch predictor tables 134(0)-134(T) that provide wider counters 136(0)-136(C), 138(0)-138(C) generally result in more accurate branch predictions. However, the size of the branch predictor tables 134(0)-134(T) may be limited by design and performance constraints of the processor, such as cycle times, area constraints, and power constraints. Wider counters 136(0)-136(C), 138(0)-138(C) also require more complex prediction hardware, such as wider adder circuits having slower speeds that impose processor frequency limitations.

Accordingly, in this regard, the branch predictor training circuit 140 of FIG. 1 is configured to perform branch predictor training using probabilistic counter updates to the branch predictor tables 134(0)-134(T). Upon determining whether a branch prediction such as the branch prediction 132 is correct, the branch predictor training circuit 140 probabilistically updates a counter corresponding to the branch prediction 132 (e.g., the counters 136(0) and 138(0) in the example described above). Stated differently, when probabilistically updating a counter, the branch predictor training circuit 140 does not update the counter for 100% of corresponding branch predictions, but rather updates the counter according to a probability value that indicates the likelihood of the update being performed. As non-limiting examples, a probability value of 0.25 would indicate that the counter is updated for a randomly selected 25% of the branch predictions corresponding to that counter, while a probability value of 0.6 would indicate that the counter is updated for a randomly selected 60% of the branch predictions corresponding to that counter. Exemplary elements of and operations performed by some aspects of the branch predictor training circuit 140 are discussed in greater detail below with respect to FIG. 2.

In this manner, narrower counters that are probabilistically updated can reproduce the functionality of wider counters while occupying less processor area. This allows either more or larger branch predictor tables to be used within the same processor area, or the same number of branch predictor tables to be used within a smaller processor area. Additionally, a simplified adder circuit that occupies less area and operates at higher frequencies can be used to sum counters, and the need for scaling coefficients for branch predictor tables can be eliminated by adjusting a probability value associated with a given branch predictor table to incorporate a desired scaling coefficient for that branch predictor table.

To illustrate exemplary elements of and operations performed by the branch predictor training circuit 140 of FIG. 1, FIG. 2 is provided. As seen in FIG. 2, an instruction stream 200, including a conditional branch instruction 202, a conditional branch instruction 204, and a conditional branch instruction 206, is being executed (e.g., by the instruction processing circuit 104 of FIG. 1). Each of the conditional branch instructions 202, 204, and 206 corresponds to a branch prediction 208, 210, and 212, respectively, that is generated by the branch predictor circuit 128 of FIG. 1, and that is provided to the branch predictor training circuit 140 of FIG. 1 for training purposes. To simplify the example illustrated in FIG. 2, it is assumed that each of the conditional branch instructions 202, 204, and 206 are encountered and executed independently of the others within the instruction stream 200, such that there is no dependency between e.g., the conditional branch instructions 202 and 204 or the conditional branch instructions 204 and 206.

Also shown in FIG. 2 are the branch predictor tables 134(0)-134(T) of FIG. 1, comprising the counters 136(0)-136(C) and the counters 138(0)-138(C), respectively. As seen in FIG. 2, the counters 136(0)-136(C) of the branch predictor table 134(0) each comprise a plurality of bits 214(0)-214(B), 214'(0)-214'(B), while the counters 138(0)-138(C) of the branch predictor table 134(T) each comprise a plurality of bits 216(0)-216(X), 216'(0)-216(X). In some aspects, the number of bits B and X may be the same (i.e., the counters 136(0)-136(C) and the counters 138(0)-138(C) each may be the same size), while some aspects may provide that the number of bits B and X may differ (i.e., the counters 136(0)-136(C) and the counters 138(0)-138(C) each may be different sizes).

Upon execution of the conditional branch instruction 202, the branch predictor training circuit 140 determines whether the branch prediction 208 is correct. This may be based on, e.g., a result 218 of execution of the conditional branch instruction 202 that is provided to the branch predictor training circuit 140 by the execution circuit 114 of the instruction processing circuit 104 of FIG. 1. Based on the determination, the branch predictor training circuit 140 probabilistically updates one or more counters among the counters 136(0)-136(C) and the counters 138(0)-138(C) that corresponds to the branch prediction 208. Thus, for example, if the counter 136(0) of the branch predictor table 134(0) and the counter 138(0) of the branch predictor table 134(T) both correspond to the branch prediction 208, the branch predictor training circuit 140 probabilistically updates the counter 136(0) and the counter 138(0).

Some aspects of the branch predictor training circuit 140 may provide a global probability value 220 that applies to all of the branch predictor tables 134(0)-134(T). In such aspects, the counter 136(0) and the counter 138(0) are both probabilistically updated using the same global probability value 220. According to some aspects, the branch predictor training circuit 140 may provide a plurality of table-specific probability values 222(0)-222(V) corresponding to some or all of the branch predictor tables 134(0)-134(T). Thus, for example, if the table-specific probability value 222(0) corresponds to the branch predictor table 134(0) and the table-specific probability value 222(V) corresponds to the branch predictor table 134(T), the counter 136(0) is probabilistically updated using the table-specific probability value 222(0), while the counter 138(0) is probabilistically updated using the table-specific probability value 222(V).

Similarly, the branch predictor training circuit 140 in some aspects may employ a same probability value for each counter transition of a counter (e.g., transitioning from a value of zero (0) to a value of one (1), from a value of one (1) to a value of two (2), and so forth) in some aspects, while some aspects may provide that different probability values may be used for different subsets of counter transitions. As non-limiting examples, a series of decreasing probability values may be used as a counter is incremented, and a series of increasing probability values may be used as a counter is decremented. Examples of transition-dependent probability values are discussed below in greater detail with respect to FIGS. 3A and 3B.

Some aspects that use the table-specific probability values 222(0)-222(V) may also eliminate the need for scaling coefficients for the branch predictor tables 134(0)-134(T) by adjusting the corresponding table-specific probability values 222(0)-222(V) based on a desired scaling coefficient. For example, the branch predictor training circuit 140 may determine a desired scaling coefficient 226 for a branch predictor table such as the branch predictor table 134(0) (based on, e.g., a historical accuracy of the branch predictor table 134(0), as a non-limiting example). The branch predictor training circuit 140 may then modify a table-specific probability value corresponding to the branch predictor table 134(0) (e.g., the table-specific probability value 222(0), as a non-limiting example) based on the desired scaling coefficient 226. For example, if the desired scaling coefficient 226 is determined to have a value of two (2), the table-specific probability value 222(0) associated with the branch predictor table 134(0) may be doubled (e.g., a probability value of 0.25 may be modified to a probability value of 0.5).

The branch predictor training circuit 140 in some aspects may be configured to update only some of counters 136(0)-136(C), 138(0)-138(C) of the branch predictor tables 134(0)-134(T) probabilistically, with the remainder being updated non-probabilistically in conventional fashion. Assume, for example, that the counters 136(0)-136(C) of the branch predictor table 134(0) are to be updated probabilistically, while the counters 138(0)-138(C) of the branch predictor table 134(T) are to be updated non-probabilistically. Assume further that the counter 136(C) of the branch predictor table 134(0) and the counter 138(C) of the branch predictor table 134(T) correspond to the branch prediction 210. Accordingly, in such aspects, upon execution of the conditional branch instruction 204 and receiving a result 224 of the execution, the branch predictor training circuit 140 may determine whether the corresponding branch prediction 210 is correct. Based on the determination, the branch predictor training circuit 140 probabilistically updates the counter 136(C) of the branch predictor table 134(0), and further non-probabilistically updates the counter 138(C) of the branch predictor table 134(T).

According to some aspects, the branch predictor training circuit 140 may track a prediction accuracy for each of one or more of the branch predictor tables 134(0)-134(T), and may take corrective action if the prediction accuracy falls below an accuracy threshold 228. In some aspects, the branch predictor training circuit 140 may revert to non-probabilistically updating the counters 136(0)-136(C), 138(0)-138(C) for one of the branch predictor tables 134(0)-134(T) if a corresponding predictor accuracy falls below the accuracy threshold 228. Assume, for example, that a prediction accuracy 230 corresponds to the branch predictor table 134(0), and the counter 136(0) of the branch predictor table 134(0) corresponds to the branch prediction 212. Upon execution of the conditional branch instruction 206 and receiving a result 232 of the execution, the branch predictor training circuit 140 may determine whether the corresponding branch prediction 212 is correct. Based on the determination, the branch predictor training circuit 140 in such aspects may further determine whether the prediction accuracy 230 is below the accuracy threshold 228. If so, the branch predictor training circuit 140 may non-probabilistically update the counter 136(0) of the branch predictor table 134(0), instead of performing a probabilistic update.

Other corrective actions may also be performed by some aspects of the branch predictor training circuit 140. In some aspects, upon determining that the prediction accuracy 230 for the branch predictor table 134(0) is below the accuracy threshold 228, the branch predictor training circuit 140 may increase the number B of bits 214(0)-214(B), 214'(0)-214'(B) of each of the counters 136(0)-136(C) of the branch predictor table 134(0) in the example above. This may result in fewer, but potentially more accurate, counters 136(0)-136(C) in the branch predictor table 134(0). It is noted that increasing the number B of bits 214(0)-214(B), 214'(0)-214'(B) would require that any adder circuits employed by the branch predictor circuit 128 of FIG. 1 be capable of handling the largest potential value of B when summing up counter values retrieved from the branch predictor table 134(0).

Figure 3A:
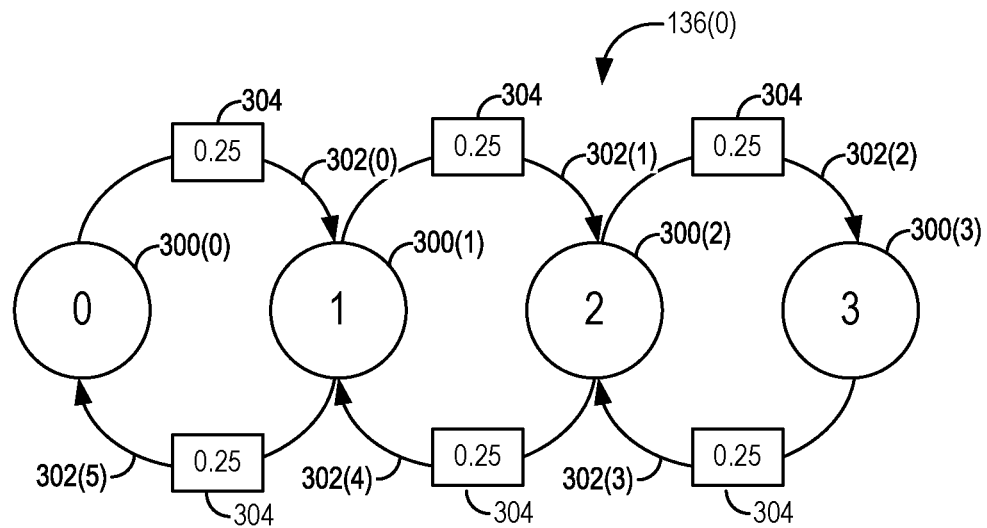
FIGS. 3A and 3B illustrate the use of fixed probabilities for counter transitions and variable transition-dependent probabilities, respectively, according to some aspects of the branch predictor training circuit of FIGS. 1 and 2.
Figure 3B:
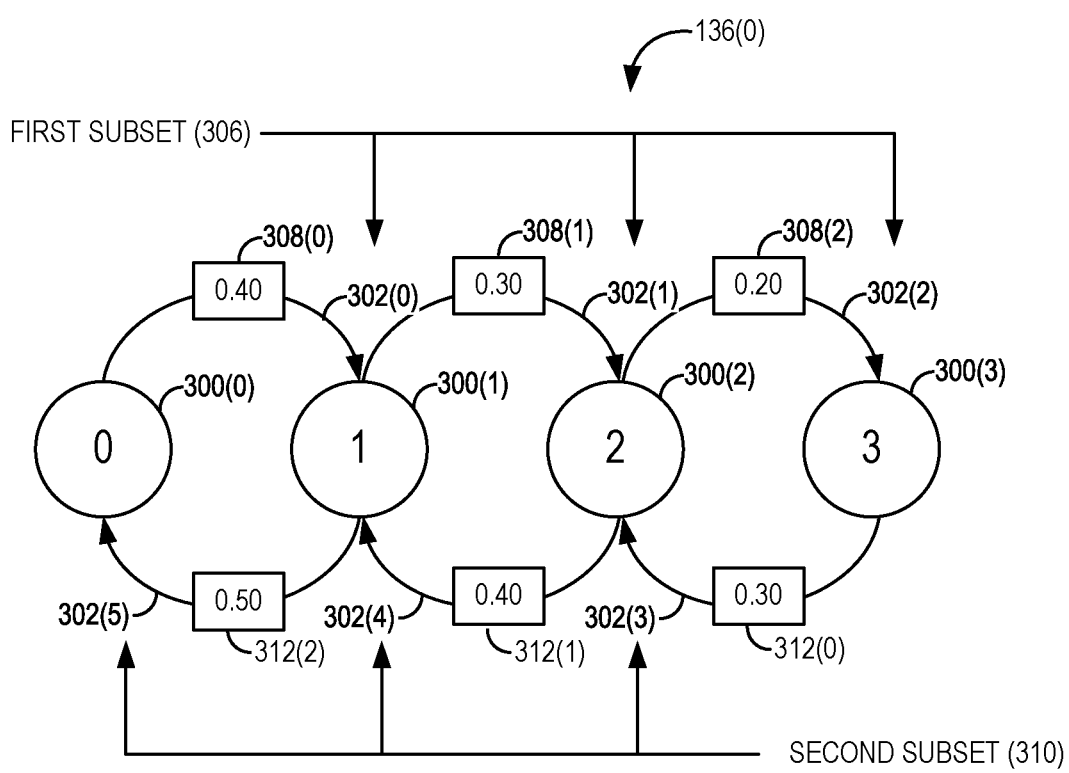

As noted above, some aspects of the branch predictor training circuit 140 may use a same probability value for each counter transition of a counter, while some aspects may provide that different probability values may be used for different subsets of counter transitions. To illustrate examples of counter transitions and corresponding probability values for a counter such as the counter 136(0) of FIG. 1, FIGS. 3A and 3B are provided. FIGS. 3A and 3B each illustrate values 300(0)-300(3) that may be stored in a two (2)-bit counter such as the counter 136(0) of FIG. 1, and the possible counter transitions 302(0)-302(5) among the values 300(0)-300(3). Thus, for example, incrementing from the value 300(0) ("0") to the value 300(1) ("1") is represented by the counter transition 302(0), while decrementing from the value 300(3) ("3") to the value 300(2) ("2") is represented by the counter transition 302(3).

In FIG. 3A, each counter transition 302(0)-302(5) is associated with a same probability value 304, which in this example has a value of 0.25. Consequently, the counter 136(0) illustrated by FIG. 3A has the same likelihood of being probabilistically updated regardless of either the current value 300(0)-300(3) of the counter or which counter transition 302(0)-302(5) is taking place. In all cases, the probability value 304 indicates that the counter 136(0) has a 25% chance of being updated.

In contrast, FIG. 3B shows the counter transitions 302(0)-305(5) associated with different probability values. In particular, a first subset 306 consisting of the counter transitions 302(0)-302(2) is associated with probability values 308(0)-308(2), while a second subset 310 consisting of the counter transitions 302(3)-302(5) is associated with probability values 312(0)-312(2). In the example of FIG. 3B, the probability values 308(0)-308(2) associated with the first subset 306 decrease in value, with the probability value 308(0) having a value of 0.4, the probability value 308(1) having a value of 0.3, and the probability value of 308(2) having a value of 0.2. As a result, the probability of a branch predictor, such as the branch predictor training circuit 140 of FIGS. 1 and 2, updating the counter 136(0) decreases as the value of the counter 136(0) is incremented. Conversely, the probability values 312(0)-312(2) associated with the second subset 310 increase in value, with the probability value 312(0) having a value of 0.3, the probability value 312(1) having a value of 0.4, and the probability value of 312(2) having a value of 0.5. Consequently, the branch predictor training circuit 140 of FIGS. 1 and 2 becomes increasingly likely to probabilistically update the counter 136(0) as the value of the counter 136(0) is decremented.

To illustrate exemplary operations performed by the branch predictor training circuit 140 of FIGS. 1 and 2 according to some aspects, FIGS. 4A-4C provide a flowchart 400. Elements of FIGS. 1, 2, 3A, and 3B are referenced in describing FIGS. 4A-4C for the sake of clarity. It is to be understood that some operations illustrated in FIGS. 4A-4C may be performed in an order other than that shown herein, and/or may be omitted in some aspects. Operations in FIG. 4A begin with a branch predictor training circuit, such as the branch predictor training circuit 140 of FIGS. 1 and 2, determining whether a first branch prediction (e.g., the branch prediction 208 of FIG. 2) generated for a first conditional branch instruction (e.g., the conditional branch instruction 202 of FIG. 2) by a branch predictor circuit of a processor (such as the branch predictor circuit 128 of the processor 102 of FIG. 1) is correct (block 402). Based on determining whether the first branch prediction 208 is correct, the branch predictor training circuit 140 probabilistically updates a first counter, such as the counter 136(0), corresponding to the first branch prediction 208, of a plurality of counters (e.g., the counters 136(0)-136(C) of FIG. 1) of a first branch predictor table (e.g., the branch predictor table 134(0) of FIG. 1) of a plurality of branch predictor tables (e.g., the branch predictor tables 134(0)-134(T) of FIG. 1) (block 404).

In some aspects, the operations of block 404 for probabilistically updating the first counter 136(0) are based a global probability value (e.g., the global probability value 220 of FIG. 2) corresponding to all branch predictor tables of the plurality of branch predictor tables 134(0)-134(T) (block 406). Some aspects may provide that the operations of block 404 for probabilistically updating the first counter 136(0) are based on a table-specific probability value, such as the table-specific probability value 222(0) of FIG. 2, corresponding to the first branch predictor table 134(0) (block 408).

According to some aspects, the operations of block 404 for probabilistically updating the first counter 136(0) comprise using a same probability value, such as the probability value 304 of FIG. 3A, for all counter transitions, such as the counter transitions 302(0)-302(5) of FIG. 3A (block 410). In some aspects, different probability values may be used for different counter transitions. Thus, in such aspects, the operations of block 404 for probabilistically updating the first counter 136(0) may comprise, for a first subset of counter transitions (e.g., the first subset 306 of FIG. 3B), probabilistically updating the first counter 136(0) using a corresponding one or more first probability values (e.g., the probability values 308(0)-308(2) of FIG. 3B) (block 412). The operations of block 404 for probabilistically updating the first counter 136(0) in such aspects may further comprise, for a second subset of counter transitions (e.g., the second subset 310 of FIG. 3B), probabilistically updating the first counter 136(0) using a corresponding one or more second probability values (e.g., the probability values 312(0)-312(2) of FIG. 3B) (block 414). Operations according to some aspects may continue at block 416 of FIG. 4B.

Referring now to FIG. 4B, some aspects may provide that the branch predictor training circuit 140 may employ non-probabilistic counter updates for some branch predictor tables among the branch predictor tables 134(0)-134(T). Thus, in such embodiments, the branch predictor training circuit 140 may determine whether a second branch prediction, such as the branch prediction 210 of FIG. 2, generated for a second conditional branch instruction, such as the conditional branch instruction 204 of FIG. 2, by the branch predictor circuit 128 is correct (block 416). Based on determining whether the second branch prediction 210 is correct, the branch predictor training circuit 140 may non-probabilistically update a second counter, such as the counter 138(C) of FIG. 1, corresponding to the second branch prediction 210, of a plurality of counters (e.g., the counters 138(0)-138(C) of FIG. 1) of a second branch predictor table (e.g., the branch predictor table 134(T) of FIG. 1) of the plurality of branch predictor tables 134(0)-134(T) (block 418).

In some aspects, the particular probability value(s) used by the branch predictor training circuit 140 for probabilistically updating counters for a given branch predictor table may be selected to reproduce the effect of a scaling coefficient for the branch predictor table. Accordingly, such embodiments may provide that the branch predictor training circuit 140 may modify the table-specific probability value 222(0) corresponding to the first branch predictor table 134(0) based on a scaling coefficient, such as the scaling coefficient 226 of FIG. 2, for the first branch predictor table 134(0) (block 420). Operations according to some aspects may continue at block 422 of FIG. 4C.

Referring now to FIG. 4C, as discussed above, in some aspects the branch predictor training circuit 140 monitors the prediction accuracy 230 of FIG. 2 for comparison with the accuracy threshold 228 of FIG. 2, and, if the prediction accuracy 230 falls below the accuracy threshold 228, may take action to attempt to improve the prediction accuracy 230. Thus, in some such aspects, the branch predictor training circuit 140 may determine whether a third branch prediction (e.g., the branch prediction 212 of FIG. 2) generated for a third conditional branch instruction (e.g., the conditional branch instruction 206 of FIG. 2) by the branch predictor circuit 128 is correct (block 422). Based on the determining, the branch predictor training circuit 140 performs a series of operations (block 424). The branch predictor training circuit 140 first determines that the prediction accuracy 230 corresponding to the first branch predictor table 134(0) is below the accuracy threshold 228 (block 426). The branch predictor training circuit 140, responsive to determining that the prediction accuracy 230 corresponding to the first branch predictor table 134(0) is below the accuracy threshold 228, then non-probabilistically updates a third counter (e.g., the counter 136(C) of FIG. 1) corresponding to the third branch prediction 212, of the plurality of counters 136(0)-136(C) of the first branch predictor table 134(0) (block 428).

Some such aspects may provide that the branch predictor training circuit 140 may determine that the prediction accuracy 230 corresponding to the first branch predictor table 134(0) is below the accuracy threshold 228 (block 430). The branch predictor training circuit 140, responsive to determining that the prediction accuracy 230 corresponding to the first branch predictor table 134(0) is below the accuracy threshold 228, may then increase the number of bits 214(0)-214(B), 214'(0)-214'(B) of each counter of the plurality of counters 136(0)-136(C) of the first branch predictor table 134(0) (block 432).

FIG. 5 is a block diagram of an exemplary processor-based system 500 that includes a processor 502 (e.g., a microprocessor) that includes an instruction processing circuit 504 that comprises a branch predictor training circuit (captioned "BPTC" in FIG. 5) 506 that corresponds in functionality to the branch predictor training circuit 140 of FIG. 1. The instruction processing circuit 504 can be the instruction processing circuit 104 in the processor 102 in FIG. 1 as an example. The processor-based system 500 can be the processor-based system 100 in FIG. 1 as an example. The processor-based system 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer.

In this example, the processor 502 represents one or more general-purpose processing circuits, such as a microprocessor, central processing unit, or the like. The processor 502 is configured to execute processing logic in instructions for performing the operations and steps discussed herein. In this example, the processor 502 includes an instruction cache 508 for temporary, fast access memory storage of instructions accessible by the instruction processing circuit 504. Fetched or prefetched instructions from a memory, such as from the system memory 510 over a system bus 512, are stored in the instruction cache 508. The instruction processing circuit 504 is configured to process instructions fetched into the instruction cache 508 and process the instructions for execution.

The processor 502 and the system memory 510 are coupled to the system bus 512 and can intercouple peripheral devices included in the processor-based system 500. As is well known, the processor 502 communicates with these other devices by exchanging address, control, and data information over the system bus 512. For example, the processor 502 can communicate bus transaction requests to a memory controller 514 in the system memory 510 as an example of a slave device. Although not illustrated in FIG. 5, multiple system buses 512 could be provided, wherein each system bus constitutes a different fabric. In this example, the memory controller 514 is configured to provide memory access requests to a memory array 516 in the system memory 510. The memory array 516 is comprised of an array of storage bit cells for storing data. The system memory 510 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 512. As illustrated in FIG. 5, these devices can include the system memory 510, one or more input device(s) 518, one or more output device(s) 520, a modem 522, and one or more display controllers 524, as examples. The input device(s) 518 can include any type of input device, including but not limited to input keys, switches, voice processors, etc. The output device(s) 520 can include any type of output device, including but not limited to audio, video, other visual indicators, etc. The modem 522 can be any device configured to allow exchange of data to and from a network 526. The network 526 can be any type of network, including but not limited to a wired or wireless network, a private or public network, a local area network (LAN), a wireless local area network (WLAN), a wide area network (WAN), a BLUETOOTH™ network, and the Internet. The modem 522 can be configured to support any type of communications protocol desired. The processor 502 may also be configured to access the display controller(s) 524 over the system bus 512 to control information sent to one or more displays 528. The display(s) 528 can include any type of display, including but not limited to a cathode ray tube (CRT), a liquid crystal display (LCD), a plasma display, etc.

The processor-based system 500 in FIG. 5 may include a set of instructions 530 to be executed by the processor 502 for any application desired according to the instructions. The instructions 530 may be stored in the system memory 510, processor 502, and/or instruction cache 508 as examples of a non-transitory computer-readable medium 532. The instructions 530 may also reside, completely or at least partially, within the system memory 510 and/or within the processor 502 during their execution. The instructions 530 may further be transmitted or received over the network 526 via the modem 522, such that the network 526 includes the computer-readable medium 532.

While the computer-readable medium 532 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented 410650-US-NP 21 as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A hardware branch predictor training circuit, configured to:
   determine whether a first branch prediction generated for a first conditional branch instruction by a branch predictor circuit of a processor is correct;
   based on determining whether the first branch prediction is correct, probabilistically update a first counter, corresponding to the first branch prediction, of a plurality of counters of a first branch predictor table of a plurality of branch predictor tables based on a table-specific probability value corresponding to the first branch predictor table;

determine whether a third branch prediction generated for a third conditional branch instruction by the branch predictor circuit is correct; and based on determining whether the third branch prediction is correct:
    determine that a prediction accuracy corresponding to the first branch predictor table is below an accuracy threshold; and
    responsive to determining that the prediction accuracy corresponding to the first branch predictor table is below the accuracy threshold, non-probabilistically update a third counter, corresponding to the third branch prediction, of the plurality of counters of the first branch predictor table;

wherein the table-specific probability value is one of a plurality of table-specific probability values that each correspond to a branch predictor table of the plurality of branch predictor tables.

2. The hardware branch predictor training circuit of claim 1, further configured to:
    determine whether a second branch prediction generated for a second conditional branch instruction by the branch predictor circuit is correct; and
    based on determining whether the second branch prediction is correct, non-probabilistically update a second counter, corresponding to the second branch prediction, of a plurality of counters of a second branch predictor table of the plurality of branch predictor tables.

3. The hardware branch predictor training circuit of claim 1, further configured to modify the table-specific probability value corresponding to the first branch predictor table based on a scaling coefficient for the first branch predictor table.

4. The hardware branch predictor training circuit of claim 1, wherein the hardware branch predictor training circuit is further configured to:
    responsive to determining that the prediction accuracy corresponding to the first branch predictor table is below the accuracy threshold, increase a number of bits of each counter of the plurality of counters of the first branch predictor table.

5. The hardware branch predictor training circuit of claim 1, wherein the hardware branch predictor training circuit is configured to probabilistically update the first counter by being configured to probabilistically update the first counter using a same probability value for all counter transitions.

6. The hardware branch predictor training circuit of claim 1, wherein the hardware branch predictor training circuit is configured to probabilistically update the first counter by being configured to:
    for a first subset of counter transitions, probabilistically update the first counter using a corresponding one or more first probability values; and
    for a second subset of counter transitions, probabilistically update the first counter using a corresponding one or more second probability values;
    wherein the one or more first probability values and the one or more second probability values are different.

7. The hardware branch predictor training circuit of claim 6, wherein:
    the first subset of counter transitions comprises incrementing counter transitions;
    the one or more first probability values comprise a series of decreasing probability values;
    the second subset of counter transitions comprises decrementing counter transitions; and
    the one or more second probability values comprise a series of increasing probability values.

8. A method of training a branch predictor circuit, comprising:
    determining, by a branch predictor training circuit of a processor, whether a first branch prediction generated for a first conditional branch instruction by a branch predictor circuit of the processor is correct;
    based on determining whether the first branch prediction is correct, probabilistically updating a first counter, corresponding to the first branch prediction, of a plurality of counters of a first branch predictor table of a plurality of branch predictor tables based on a table-specific probability value corresponding to the first branch predictor table;
    determining whether a third branch prediction generated for a third conditional branch instruction by the branch predictor circuit is correct; and
    based on determining whether the third branch prediction is correct:
        determining that a prediction accuracy corresponding to the first branch predictor table is below an accuracy threshold; and
        responsive to determining that the prediction accuracy corresponding to the first branch predictor table is below the accuracy threshold, non-probabilistically updating a third counter, corresponding to the third branch prediction, of the plurality of counters of the first branch predictor table;
    wherein the table-specific probability value is one of a plurality of table-specific probability values that each correspond to a branch predictor table of the plurality of branch predictor tables.

9. The method of claim 8, further comprising:
    determining whether a second branch prediction generated for a second conditional branch instruction by the branch predictor circuit is correct; and
    based on determining whether the second branch prediction is correct, non-probabilistically updating a second counter, corresponding to the second branch prediction, of a plurality of counters of a second branch predictor table of the plurality of branch predictor tables.

10. The method of claim 8, further comprising modifying the table-specific probability value corresponding to the first branch predictor table based on a scaling coefficient for the first branch predictor table.

11. The method of claim 8, further comprising:
    responsive to determining that the prediction accuracy corresponding to the first branch predictor table is below the accuracy threshold, increasing a number of bits of each counter of the plurality of counters of the first branch predictor table.

12. The method of claim 8, wherein probabilistically updating the first counter comprises probabilistically updating the first counter using a same probability value for all counter transitions.

13. The method of claim 8, wherein probabilistically updating the first counter comprises:
    for a first subset of counter transitions, probabilistically updating the first counter using a corresponding one or more first probability values; and
    for a second subset of counter transitions, probabilistically updating the first counter using a corresponding one or more second probability values;

wherein the one or more first probability values and the one or more second probability values are different.

14. The method of claim 13, wherein:
the first subset of counter transitions comprises incrementing counter transitions;
the one or more first probability values comprise a series of decreasing probability values;
the second subset of counter transitions comprises decrementing counter transitions; and
the one or more second probability values comprise a series of increasing probability values.

15. A processor-based system, comprising:
a processor, comprising a branch predictor circuit and a branch predictor training circuit; and
the branch predictor training circuit configured to:
determine whether a first branch prediction generated for a first conditional branch instruction by the branch predictor circuit is correct;
based on determining whether the first branch prediction is correct, probabilistically update a first counter, corresponding to the first branch prediction, of a plurality of counters of a first branch predictor table of a plurality of branch predictor tables based on a table-specific probability value corresponding to the first branch predictor table;
determine whether a third branch prediction generated for a third conditional branch instruction by the branch predictor circuit is correct; and
based on determining whether the third branch prediction is correct:
determine that a prediction accuracy corresponding to the first branch predictor table is below an accuracy threshold; and
responsive to determining that the prediction accuracy corresponding to the first branch predictor table is below the accuracy threshold, non-probabilistically update a third counter, corresponding to the third branch prediction, of the plurality of counters of the first branch predictor table;
wherein the table-specific probability value is one of a plurality of table-specific probability values that each correspond to a branch predictor table of the plurality of branch predictor tables.

* * * * *